United States Patent Office 2,746,961
Patented May 22, 1956

2,746,961

NOVEL PURINE COMPOUNDS FROM 6-CHLOROPURINE

George H. Hitchings, Tuckahoe, and Gertrude B. Elion, Bronxville, N. Y., assignors to Burroughs Wellcome & Co. (U. S. A.) Inc., Tuckahoe, N. Y., a corporation of New York No Drawing. Application July 13, 1953,
Serial No. 367,772

3 Claims. (Cl. 260—252)

This invention relates to novel purine compounds substituted at the 6 position of the purine ring and a method of preparing them.

In our copending application Serial No. 292,975, now Patent 2,691,654, is described the preparation of a number of 6-substituted purines from 6-mercapto and 6-alkylmercapto purines. These 6-substituted purines are of value as inhibitors of microorganisms and in certain cases constitute useful pharmaceutical intermediates in the preparation of highly valuable compounds of tumor interest. This invention relates to a further intermediate and its method of preparation from which hitherto unknown highly valuable 6-substituted purines may be prepared.

In accordance with the invention 6-chloropurine is prepared by a novel method and this compound, which may incidentally be used in the preparation of the 6-mercapto and 6-amino purines, is more particularly useful in the synthesis of certain derivatives which are not readily attainable via the 6-mercaptopurine route as described in the copending application. These derivatives encompass a wide range of 6-substituted purines and in accordance with the invention purine compounds substituted at the 6 position with cyano, carboxy, selenyl, telluryl, iodo, fluoro and alkyl and aryl as derived through reactions with organo metal derivatives are readily prepared. Many of these compounds are specifically active in the treatment of experimental tumors in animals.

In accordance with one phase of the invention 6-chloropurine is formed by the treatment of hypoxanthine with phosphoryl chloride in the presence of an unreactive base such as dimethyl aniline. It may likewise be formed by heating hypoxanthine under pressure with phosphoryl chloride as well as with a reagent prepared by adding water, preferably about 5% by volume, to dry phosphoryl chloride.

The following examples are illustrative.

EXAMPLE 1

A mixture of 5 g. of hypoxanthine, 1.0 g. of N,N-dimethylaniline and 100 ml. of phosphoryl chloride was refluxed for 2 hours. The hypoxanthine gradually dissolved. The reaction mixture was evaporated to a small volume in vacuo. The residue was reached with a small quantity of ether, and the 6-chloropurine was recovered by solution in methanol.

EXAMPLE 2

A mixture of 2 g. of hypoxanthine and 20 ml. of phosphoryl chloride was heated in a sealed tube at 160° for 5 hours. The mixture was evaporated to a small volume in vacuo and poured over ice. By the addition of ammonium hydroxide the pH value of the solution was adjusted to about 5 with the formation of a precipitate containing 6-chloropurine. The 6-chloropurine was recovered by leaching the precipitate with hot acetone.

EXAMPLE 3

A mixture of 8 g. of hypoxanthine and 48 ml. of phosphoryl chloride, to which had been added 2.5 ml. of water, was heated in a sealed tube at 165° for 6 hours. The mixture was evaporated to a small volume in vitro, poured over ice and the 6-chloropurine recovered by continuous extraction with ether.

6-chloropurine is characterized by its ultra-violet absorption spectrum having band at about 265 m$\mu$ at pH 1 which shifts to about 273 m$\mu$ at pH 11.

EXAMPLE 4

6-methoxypurine

To a solution of sodium methoxide, from 1.15 g. sodium, in 200 ml. of methanol was added 7.35 g. of 6-chloropurine and the mixture heated in a sealed vessel at 100° for 3 hours. After cooling, 200 ml. of ether was added to the reaction mixture and the precipitate filtered off. The alcohol-ether filtrate was brought to pH 5 with alcoholic hydrogen chloride and the precipitate of crude 6-methoxypurine was collected. The methoxypurine was suspended in 75 ml. of water and the acidity adjusted to pH 5 with acetic acid. The mixture was chilled and filtered. The precipitate of 6-methoxypurine hemihydrate (6.1 g.) was dried at room temperature. It melts at 195–196°.

EXAMPLE 5

6-phenoxypurine

To 30 g. of phenol was added 1 g. of sodium. When the sodium was completely dissolved, 4.6 g. of 6-chloropurine was added and the mixture was heated on the steam bath for 6 hours. The mixture was cooled and diluted with 900 ml. of absolute ether to remove the excess phenol. The precipitate of the crude 6-phenoxypurine was filtered off and washed with ether. The precipitate was dissolved in 50 ml. of water by the addition of alkali. The solution was filtered, brought to pH 5 by the addition of acetic acid. After chilling, the precipitate of 6-phenoxypurine (2.7 g.) was collected.

In a similar fashion using nucleophilic reagents other 6-substituted purines of the type indicated are readily formed.

We claim:

1. The process of forming 6-chloropurine which comprises heating hypoxanthine with phosphoryl chloride at temperatures substantially above the boiling point of the latter but below 200° for 2 to 5 hours.

2. The process of forming 6-chloropurine which comprises heating hypoxanthine with a reagent formed by adding 1 to 10% water to phosphoryl chloride in a sealed system at a temperature of 140–200° for 2 to 8 hours.

3. The process of forming 6-chloropurine which comprises heating hypoxanthine with phosphoryl chloride in the presence of N,N-dimethylaniline at reflux temperature for 1 to 5 hours.

References Cited in the file of this patent

Elion et al.: JACS 73, 5235–39 (1951).